US012236753B2

(12) United States Patent
Nguyen

(10) Patent No.: US 12,236,753 B2

(45) Date of Patent: Feb. 25, 2025

(54) GAMING SYSTEMS INCLUDING VIRAL BENEFIT DISTRIBUTION

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/144,501

(22) Filed: May 8, 2023

(65) Prior Publication Data

US 2023/0274614 A1 Aug. 31, 2023

Related U.S. Application Data

(63) Continuation of application No. 16/559,553, filed on Sep. 3, 2019, now Pat. No. 11,682,266, which is a continuation of application No. 14/518,909, filed on Oct. 20, 2014, now Pat. No. 10,438,446, which is a continuation of application No. 12/617,717, filed on Nov. 12, 2009, now Pat. No. 8,864,586.

(51) Int. Cl.
*G07F 17/32* (2006.01)

(52) U.S. Cl.
CPC ............ *G07F 17/326* (2013.01); *G07F 17/32* (2013.01); *G07F 17/3225* (2013.01); *G07F 17/3244* (2013.01); *G07F 17/3272* (2013.01); *G07F 17/3218* (2013.01)

(58) Field of Classification Search
None
See application file for complete search history.

(56) References Cited

U.S. PATENT DOCUMENTS

| | | | |
|---|---|---|---|
| 2,033,638 | A | 3/1936 | Koppl |
| 2,062,923 | A | 12/1936 | Pal |
| 4,741,539 | A | 5/1988 | Sutton |
| 4,948,138 | A | 8/1990 | Pease |

(Continued)

FOREIGN PATENT DOCUMENTS

| | | | |
|---|---|---|---|
| GB | 2033638 | A | 5/1980 |
| GB | 2062923 | A | 5/1981 |

(Continued)

OTHER PUBLICATIONS

Office Action for U.S. Appl. No. 16/590,347, dated Oct. 13, 2020.

(Continued)

*Primary Examiner* — Damon J Pierce

(74) *Attorney, Agent, or Firm* — Weaver Austin Villeneuve & Sampson LLP

(57) ABSTRACT

Gaming machines and systems are configured to distribute of viral events, such as viral gaming events, amongst devices. The devices can present the viral events. The devices can, for example, be gaming machines and/or mobile devices. According to one embodiment, once a viral event is triggered, it is presented at one or more first devices at a first time. The viral event spreads to other devices, such as one or more second devices where it can be presented at a later time. The viral event may continue to spread to numerous other devices. Feedback or metrics may be used to control the devices to which the viral event spreads and/or the rate of spread.

20 Claims, 3 Drawing Sheets

(56) References Cited

U.S. PATENT DOCUMENTS

| | | | |
|---|---|---|---|
| 4,969,183 | A | 11/1990 | Reese |
| 5,067,712 | A | 11/1991 | Georgilas |
| 5,275,400 | A | 1/1994 | Weingardt |
| 5,429,361 | A | 7/1995 | Raven |
| 5,489,103 | A | 2/1996 | Okamoto |
| 5,618,232 | A | 4/1997 | Martin |
| 5,630,757 | A | 5/1997 | Gagin |
| 5,655,961 | A | 8/1997 | Acres |
| 5,704,835 | A | 1/1998 | Dietz, II |
| 5,727,786 | A | 3/1998 | Weingardt |
| 5,833,537 | A | 11/1998 | Barrie |
| 5,842,921 | A | 12/1998 | Mindes |
| 5,919,091 | A | 7/1999 | Bell |
| 5,947,820 | A | 9/1999 | Morro |
| 5,997,401 | A | 12/1999 | Crawford |
| 6,001,016 | A | 12/1999 | Walker |
| 6,039,648 | A | 3/2000 | Guinn |
| 6,059,289 | A | 5/2000 | Vancura |
| 6,089,977 | A | 7/2000 | Bennett |
| 6,095,920 | A | 8/2000 | Sadahiro |
| 6,110,041 | A | 8/2000 | Walker |
| 6,142,872 | A | 11/2000 | Walker |
| 6,146,271 | A | 11/2000 | Kadlic |
| 6,146,273 | A | 11/2000 | Olsen |
| 6,165,071 | A | 12/2000 | Weiss |
| 6,231,445 | B1 | 5/2001 | Acres |
| 6,244,958 | B1 | 6/2001 | Acres |
| 6,270,412 | B1 | 8/2001 | Crawford |
| 6,290,600 | B1 | 9/2001 | Glasson |
| 6,293,866 | B1 | 9/2001 | Walker |
| 6,353,390 | B1 | 3/2002 | Beri |
| 6,364,768 | B1 | 4/2002 | Acres |
| 6,404,884 | B1 | 6/2002 | Marwell |
| 6,416,406 | B1 | 7/2002 | Duhamel |
| 6,416,409 | B1 | 7/2002 | Jordan |
| 6,443,452 | B1 | 9/2002 | Brune |
| 6,491,584 | B2 | 12/2002 | Graham |
| 6,500,067 | B1 | 12/2002 | Luciano |
| 6,505,095 | B1 | 1/2003 | Kolls |
| 6,508,710 | B1 | 1/2003 | Paravia |
| 6,561,900 | B1 | 5/2003 | Baerlocher |
| 6,592,457 | B1 | 7/2003 | Frohm |
| 6,612,574 | B1 | 9/2003 | Cole |
| 6,620,046 | B2 | 9/2003 | Rowe |
| 6,641,477 | B1 | 11/2003 | Dietz, II |
| 6,645,078 | B1 | 11/2003 | Mattice |
| 6,675,152 | B1 | 1/2004 | Prasad |
| 6,699,128 | B1 | 3/2004 | Beadell |
| 6,719,630 | B1 | 4/2004 | Seelig |
| 6,749,510 | B2 | 6/2004 | Giobbi |
| 6,758,757 | B2 | 7/2004 | Luciano, Jr. |
| 6,773,345 | B2 | 8/2004 | Walker |
| 6,778,820 | B2 | 8/2004 | Tendler |
| 6,780,111 | B2 | 8/2004 | Cannon |
| 6,799,032 | B2 | 9/2004 | McDonnell |
| 6,800,027 | B2 | 10/2004 | Giobbi |
| 6,804,763 | B1 | 10/2004 | Stockdale |
| 6,811,486 | B1 | 11/2004 | Luciano, Jr. |
| 6,843,725 | B2 | 1/2005 | Nelson |
| 6,846,238 | B2 | 1/2005 | Wells |
| 6,848,995 | B1 | 2/2005 | Walker |
| 6,852,029 | B2 | 2/2005 | Baltz |
| 6,869,361 | B2 | 3/2005 | Sharpless |
| 6,875,106 | B2 | 4/2005 | Weiss |
| 6,884,170 | B2 | 4/2005 | Rowe |
| 6,884,172 | B1 | 4/2005 | Lloyd |
| 6,902,484 | B2 | 6/2005 | Idaka |
| 6,908,390 | B2 | 6/2005 | Nguyen |
| 6,913,532 | B2 | 7/2005 | Baerlocher |
| 6,923,721 | B2 | 8/2005 | Luciano |
| 6,935,958 | B2 | 8/2005 | Nelson |
| 6,949,022 | B1 | 9/2005 | Showers |
| 6,955,600 | B2 | 10/2005 | Glavich |
| 6,971,956 | B2 | 12/2005 | Rowe |
| 6,984,174 | B2 | 1/2006 | Cannon |
| 6,997,803 | B2 | 2/2006 | Lemay |
| 7,018,292 | B2 | 3/2006 | Tracy |
| 7,032,115 | B2 | 4/2006 | Kashani |
| 7,033,276 | B2 | 4/2006 | Walker |
| 7,035,626 | B1 | 4/2006 | Luciano, Jr. |
| 7,037,195 | B2 | 5/2006 | Schneider |
| 7,048,628 | B2 | 5/2006 | Schneider |
| 7,048,630 | B2 | 5/2006 | Berg |
| 7,063,617 | B2 | 6/2006 | Brosnan |
| 7,076,329 | B1 | 7/2006 | Kolls |
| 7,089,264 | B1 | 8/2006 | Guido |
| 7,094,148 | B2 | 8/2006 | Baerlocher |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,169,041 | B2 | 1/2007 | Tessmer |
| 7,169,052 | B2 | 1/2007 | Beaulieu |
| 7,175,523 | B2 | 2/2007 | Gilmore |
| 7,181,228 | B2 | 2/2007 | Boesch |
| 7,182,690 | B2 | 2/2007 | Giobbi |
| 7,198,571 | B2 | 4/2007 | Lemay |
| RE39,644 | E | 5/2007 | Alcorn |
| 7,217,191 | B2 | 5/2007 | Cordell |
| 7,243,104 | B2 | 7/2007 | Bill |
| 7,247,098 | B1 | 7/2007 | Bradford |
| 7,259,718 | B2 | 8/2007 | Patterson |
| 7,275,989 | B2 | 10/2007 | Moody |
| 7,285,047 | B2 | 10/2007 | Gelb |
| 7,311,608 | B1 | 12/2007 | Danieli |
| 7,314,408 | B2 | 1/2008 | Cannon |
| 7,316,615 | B2 | 1/2008 | Soltys |
| 7,316,619 | B2 | 1/2008 | Nelson |
| 7,318,775 | B2 | 1/2008 | Brosnan |
| 7,326,116 | B2 | 2/2008 | O'Donovan |
| 7,330,108 | B2 | 2/2008 | Thomas |
| 7,346,358 | B2 | 3/2008 | Wood |
| 7,355,112 | B2 | 4/2008 | Laakso |
| 7,384,338 | B2 | 6/2008 | Rothschild |
| 7,387,571 | B2 | 6/2008 | Walker |
| 7,393,278 | B2 | 7/2008 | Gerson |
| 7,396,990 | B2 | 7/2008 | Lu |
| 7,415,426 | B2 | 8/2008 | Williams |
| 7,425,177 | B2 | 9/2008 | Rodgers |
| 7,427,234 | B2 | 9/2008 | Soltys |
| 7,427,236 | B2 | 9/2008 | Kaminkow |
| 7,427,708 | B2 | 9/2008 | Ohmura |
| 7,431,650 | B2 | 10/2008 | Kessman |
| 7,448,949 | B2 | 11/2008 | Kaminkow |
| 7,500,913 | B2 | 3/2009 | Baerlocher |
| 7,510,474 | B2 | 3/2009 | Carter, Sr. |
| 7,513,828 | B2 | 4/2009 | Nguyen |
| 7,519,838 | B1 | 4/2009 | Suurballe |
| 7,559,838 | B2 | 7/2009 | Walker |
| 7,563,167 | B2 | 7/2009 | Walker |
| 7,572,183 | B2 | 8/2009 | Olivas |
| 7,585,222 | B2 | 9/2009 | Muir |
| 7,602,298 | B2 | 10/2009 | Thomas |
| 7,607,174 | B1 | 10/2009 | Kashchenko |
| 7,611,409 | B2 | 11/2009 | Muir |
| 7,637,810 | B2 | 12/2009 | Amaitis |
| 7,644,861 | B2 | 1/2010 | Alderucci |
| 7,653,757 | B1 | 1/2010 | Fernald |
| 7,693,306 | B2 | 4/2010 | Huber |
| 7,699,703 | B2 | 4/2010 | Muir |
| 7,722,453 | B2 | 5/2010 | Lark |
| 7,742,996 | B1 | 6/2010 | Kwan |
| 7,758,423 | B2 | 7/2010 | Foster |
| 7,771,271 | B2 | 8/2010 | Walker |
| 7,780,529 | B2 | 8/2010 | Rowe |
| 7,780,531 | B2 | 8/2010 | Englman |
| 7,785,192 | B2 | 8/2010 | Canterbury |
| 7,811,172 | B2 | 10/2010 | Asher |
| 7,819,749 | B1 | 10/2010 | Fish |
| 7,822,688 | B2 | 10/2010 | Labrou |
| 7,828,652 | B2 | 11/2010 | Nguyen |
| 7,828,654 | B2 | 11/2010 | Carter, Sr. |
| 7,828,661 | B1 | 11/2010 | Fish |
| 7,850,528 | B2 | 12/2010 | Wells |

(56) References Cited

U.S. PATENT DOCUMENTS 7,874,919 B2 1/2011 Paulsen
7,877,798 B2 1/2011 Saunders
7,883,413 B2 2/2011 Paulsen
7,892,097 B2 2/2011 Muir
7,909,692 B2 3/2011 Nguyen
7,909,699 B2 3/2011 Parrott
7,918,728 B2 4/2011 Nguyen
7,927,211 B2 4/2011 Rowe
7,927,212 B2 4/2011 Hedrick
7,951,008 B2 5/2011 Wolf
8,057,298 B2 11/2011 Nguyen
8,057,303 B2 11/2011 Rasmussen
8,087,988 B2 1/2012 Nguyen
8,117,608 B1 2/2012 Slettehaugh
8,133,113 B2 3/2012 Nguyen
8,182,326 B2 5/2012 Speer, II
8,210,927 B2 7/2012 Hedrick
8,221,245 B2 7/2012 Walker
8,226,459 B2 7/2012 Barrett
8,226,474 B2 7/2012 Nguyen
8,231,456 B2 7/2012 Zielinski
8,235,803 B2 8/2012 Loose
8,276,010 B2 9/2012 Vavilala
8,282,475 B2 10/2012 Nguyen
8,323,099 B2 12/2012 Durham
8,337,290 B2 12/2012 Nguyen
8,342,946 B2 1/2013 Amaitis
8,393,948 B2 3/2013 Allen
8,403,758 B2 3/2013 Hornik
8,430,745 B2 4/2013 Agarwal
8,461,958 B2 6/2013 Saenz
8,465,368 B2 6/2013 Hardy
8,469,813 B2 6/2013 Joshi
8,529,345 B2 9/2013 Nguyen
8,597,108 B2 12/2013 Nguyen
8,602,875 B2 12/2013 Nguyen
8,613,655 B2 12/2013 Kisenwether
8,613,659 B2 12/2013 Nelson
8,678,901 B1 3/2014 Kelly
8,696,470 B2 4/2014 Nguyen
8,745,417 B2 6/2014 Huang
8,821,255 B1 9/2014 Friedman
8,834,254 B2 9/2014 Buchholz
8,858,323 B2 10/2014 Nguyen
8,864,586 B2 10/2014 Nguyen
8,942,995 B1 1/2015 Kerr
9,039,507 B2 5/2015 Allen
9,235,952 B2 1/2016 Nguyen
9,292,996 B2 3/2016 Davis
9,325,203 B2 4/2016 Nguyen
9,466,171 B2 10/2016 Hornik
9,483,901 B2 11/2016 Nguyen
9,486,697 B2 11/2016 Nguyen
9,486,704 B2 11/2016 Nguyen
9,530,277 B2 12/2016 Nelson
9,576,425 B2 2/2017 Nguyen
9,626,826 B2 4/2017 Nguyen
9,666,015 B2 5/2017 Acres
9,666,021 B2 5/2017 Nguyen
9,672,686 B2 6/2017 Nguyen
9,741,205 B2 8/2017 Nguyen
9,811,973 B2 11/2017 Nguyen
9,814,970 B2 11/2017 Nguyen
9,842,462 B2 12/2017 Nguyen
9,875,606 B2 1/2018 Nguyen
9,875,609 B2 1/2018 Nguyen
9,981,180 B2 5/2018 Koyanagi
10,068,429 B2 9/2018 Gagner
10,115,270 B2 10/2018 Gagner
10,140,816 B2 11/2018 Nguyen
10,325,447 B2 6/2019 Malek
10,421,010 B2 9/2019 Nguyen
10,438,446 B2 10/2019 Nguyen
10,445,978 B2 10/2019 Nguyen
10,818,133 B2 10/2020 Nguyen
2001/0004607 A1 6/2001 Olsen
2001/0016516 A1 8/2001 Takatsuka
2001/0024971 A1 9/2001 Brossard
2001/0025272 A1 9/2001 Mori
2001/0031659 A1 10/2001 Perrie
2001/0047291 A1 11/2001 Garahi
2002/0006822 A1 1/2002 Krintzman
2002/0042295 A1 4/2002 Walker
2002/0043759 A1 4/2002 Vancura
2002/0045474 A1 4/2002 Singer
2002/0107065 A1 8/2002 Rowe
2002/0111210 A1 8/2002 Luciano
2002/0111213 A1 8/2002 McEntee
2002/0113369 A1 8/2002 Weingardt
2002/0116615 A1 8/2002 Nguyen
2002/0133418 A1 9/2002 Hammond
2002/0137217 A1 9/2002 Rowe
2002/0142825 A1 10/2002 Lark
2002/0145051 A1 10/2002 Charrin
2002/0147047 A1 10/2002 Letovsky
2002/0147049 A1 10/2002 Carter
2002/0151366 A1 10/2002 Walker
2002/0152120 A1 10/2002 Howington
2002/0167536 A1 11/2002 Valdes
2002/0177483 A1 11/2002 Cannon
2002/0183105 A1 12/2002 Cannon
2003/0001338 A1 1/2003 Bennett
2003/0003996 A1 1/2003 Nguyen
2003/0004871 A1 1/2003 Rowe
2003/0008696 A1 1/2003 Abecassis
2003/0013531 A1 1/2003 Rowe
2003/0027635 A1 2/2003 Walker
2003/0064805 A1 4/2003 Wells
2003/0064807 A1 4/2003 Walker
2003/0078094 A1 4/2003 Gatto
2003/0092480 A1 5/2003 White
2003/0100361 A1 5/2003 Sharpless
2003/0103965 A1 6/2003 Jung
2003/0104860 A1 6/2003 Cannon
2003/0104865 A1 6/2003 Itkis
2003/0148809 A1 8/2003 Nelson
2003/0162588 A1 8/2003 Brosnan
2003/0195024 A1 10/2003 Slattery
2003/0199295 A1 10/2003 Vancura
2003/0224852 A1 12/2003 Walker
2003/0224854 A1 12/2003 Joao
2004/0002386 A1 1/2004 Wolfe
2004/0005919 A1 1/2004 Walker
2004/0023709 A1 2/2004 Beaulieu
2004/0023716 A1 2/2004 Gauselmann
2004/0038736 A1 2/2004 Bryant
2004/0048650 A1 3/2004 Mierau
2004/0068460 A1 4/2004 Feeley
2004/0082384 A1 4/2004 Walker
2004/0082385 A1 4/2004 Silva
2004/0094624 A1 5/2004 Fernandes
2004/0106449 A1 6/2004 Walker
2004/0127277 A1 7/2004 Walker
2004/0127290 A1 7/2004 Walker
2004/0137987 A1 7/2004 Nguyen
2004/0142744 A1 7/2004 Atkinson
2004/0147308 A1 7/2004 Walker
2004/0152508 A1 8/2004 Lind
2004/0199631 A1 10/2004 Natsume
2004/0214622 A1 10/2004 Atkinson
2004/0224753 A1 11/2004 O'Donovan
2004/0229671 A1 11/2004 Stronach
2004/0256803 A1 12/2004 Ko
2004/0259633 A1 12/2004 Gentles
2005/0003890 A1 1/2005 Hedrick
2005/0004980 A1 1/2005 Vadjinia
2005/0026696 A1 2/2005 Hashimoto
2005/0033651 A1 2/2005 Kogan
2005/0043996 A1 2/2005 Silver
2005/0054446 A1 3/2005 Kammler
2005/0101376 A1 5/2005 Walker
2005/0101383 A1 5/2005 Wells
2005/0130728 A1 6/2005 Nguyen
2005/0130731 A1 6/2005 Englman

(56) References Cited

U.S. PATENT DOCUMENTS

| | | | |
|---|---|---|---|
| 2005/0137014 A1 | 6/2005 | Vetelainen | |
| 2005/0143169 A1 | 6/2005 | Nguyen | |
| 2005/0167921 A1 | 8/2005 | Finocchio | |
| 2005/0170883 A1 | 8/2005 | Muskin | |
| 2005/0181865 A1 | 8/2005 | Luciano, Jr. | |
| 2005/0181870 A1 | 8/2005 | Nguyen | |
| 2005/0181875 A1 | 8/2005 | Hoehne | |
| 2005/0187020 A1 | 8/2005 | Amaitis | |
| 2005/0202865 A1 | 9/2005 | Kim | |
| 2005/0202875 A1 | 9/2005 | Murphy | |
| 2005/0208993 A1 | 9/2005 | Yoshizawa | |
| 2005/0209002 A1 | 9/2005 | Blythe | |
| 2005/0221881 A1 | 10/2005 | Lannert | |
| 2005/0223219 A1 | 10/2005 | Gatto | |
| 2005/0239546 A1 | 10/2005 | Hedrick | |
| 2005/0255919 A1 | 11/2005 | Nelson | |
| 2005/0273635 A1 | 12/2005 | Wilcox | |
| 2005/0277471 A1 | 12/2005 | Russell | |
| 2005/0282637 A1 | 12/2005 | Gatto | |
| 2006/0009283 A1 | 1/2006 | Englman | |
| 2006/0036874 A1 | 2/2006 | Cockerille | |
| 2006/0046822 A1 | 3/2006 | Kaminkow | |
| 2006/0046823 A1* | 3/2006 | Kaminkow | G07F 17/326 463/16 |
| 2006/0046830 A1 | 3/2006 | Webb | |
| 2006/0046849 A1 | 3/2006 | Kovacs | |
| 2006/0068893 A1 | 3/2006 | Jaffe | |
| 2006/0068897 A1 | 3/2006 | Sanford | |
| 2006/0073869 A1 | 4/2006 | LeMay | |
| 2006/0073888 A1 | 4/2006 | Nguyen | |
| 2006/0073897 A1 | 4/2006 | Englman | |
| 2006/0079317 A1 | 4/2006 | Flemming | |
| 2006/0121972 A1 | 6/2006 | Walker | |
| 2006/0126529 A1 | 6/2006 | Hardy | |
| 2006/0148551 A1 | 7/2006 | Walker | |
| 2006/0189382 A1 | 8/2006 | Muir | |
| 2006/0217170 A1 | 9/2006 | Roireau | |
| 2006/0217193 A1 | 9/2006 | Walker | |
| 2006/0247028 A1 | 11/2006 | Brosnan | |
| 2006/0247035 A1 | 11/2006 | Rowe | |
| 2006/0252530 A1 | 11/2006 | Oberberger | |
| 2006/0253481 A1 | 11/2006 | Guido | |
| 2006/0256135 A1 | 11/2006 | Aoyama | |
| 2006/0281525 A1 | 12/2006 | Borissov | |
| 2006/0281541 A1 | 12/2006 | Nguyen | |
| 2006/0287106 A1 | 12/2006 | Jensen | |
| 2007/0004510 A1 | 1/2007 | Underdahl | |
| 2007/0026935 A1 | 2/2007 | Wolf | |
| 2007/0026942 A1 | 2/2007 | Kinsley | |
| 2007/0054739 A1 | 3/2007 | Amaitis | |
| 2007/0060254 A1 | 3/2007 | Muir | |
| 2007/0060306 A1 | 3/2007 | Amaitis | |
| 2007/0060319 A1 | 3/2007 | Block | |
| 2007/0060358 A1 | 3/2007 | Amaitis | |
| 2007/0077981 A1 | 4/2007 | Hungate | |
| 2007/0087833 A1 | 4/2007 | Feeney | |
| 2007/0087834 A1 | 4/2007 | Moser | |
| 2007/0093299 A1 | 4/2007 | Bergeron | |
| 2007/0129123 A1 | 6/2007 | Eryou | |
| 2007/0129148 A1 | 6/2007 | Van Luchene | |
| 2007/0149279 A1 | 6/2007 | Norden | |
| 2007/0149286 A1 | 6/2007 | Bemmel | |
| 2007/0159301 A1 | 7/2007 | Hirt | |
| 2007/0161402 A1 | 7/2007 | Ng | |
| 2007/0184896 A1 | 8/2007 | Dickerson | |
| 2007/0184904 A1 | 8/2007 | Lee | |
| 2007/0191109 A1 | 8/2007 | Crowder, Jr. | |
| 2007/0207852 A1 | 9/2007 | Nelson | |
| 2007/0207854 A1 | 9/2007 | Wolf | |
| 2007/0235521 A1 | 10/2007 | Mateen | |
| 2007/0238505 A1 | 10/2007 | Okada | |
| 2007/0241187 A1 | 10/2007 | Alderucci | |
| 2007/0248036 A1 | 10/2007 | Nevalainen | |
| 2007/0257430 A1 | 11/2007 | Hardy | |
| 2007/0259713 A1 | 11/2007 | Fiden | |
| 2007/0259716 A1 | 11/2007 | Mattice | |
| 2007/0259717 A1 | 11/2007 | Mattice | |
| 2007/0265984 A1 | 11/2007 | Santhana | |
| 2007/0270213 A1 | 11/2007 | Nguyen | |
| 2007/0275777 A1 | 11/2007 | Walker | |
| 2007/0275779 A1 | 11/2007 | Amaitis | |
| 2007/0281782 A1 | 12/2007 | Amaitis | |
| 2007/0281785 A1 | 12/2007 | Amaitis | |
| 2007/0298858 A1 | 12/2007 | Toneguzzo | |
| 2007/0298873 A1 | 12/2007 | Nguyen | |
| 2008/0013906 A1 | 1/2008 | Matsuo | |
| 2008/0015032 A1 | 1/2008 | Bradford | |
| 2008/0020824 A1 | 1/2008 | Cuddy | |
| 2008/0020845 A1 | 1/2008 | Low | |
| 2008/0032787 A1 | 2/2008 | Low | |
| 2008/0070652 A1 | 3/2008 | Nguyen | |
| 2008/0070681 A1 | 3/2008 | Marks | |
| 2008/0076505 A1 | 3/2008 | Nguyen | |
| 2008/0076506 A1 | 3/2008 | Nguyen | |
| 2008/0076548 A1 | 3/2008 | Paulsen | |
| 2008/0076572 A1 | 3/2008 | Nguyen | |
| 2008/0096650 A1 | 4/2008 | Baerlocher | |
| 2008/0102916 A1 | 5/2008 | Kovacs | |
| 2008/0102935 A1 | 5/2008 | Finnimore | |
| 2008/0102956 A1 | 5/2008 | Burman | |
| 2008/0102957 A1 | 5/2008 | Burman | |
| 2008/0108401 A1 | 5/2008 | Baerlocher | |
| 2008/0113772 A1 | 5/2008 | Burrill | |
| 2008/0119267 A1 | 5/2008 | Denlay | |
| 2008/0139274 A1 | 6/2008 | Baerlocher | |
| 2008/0139306 A1 | 6/2008 | Lutnick | |
| 2008/0146321 A1 | 6/2008 | Parente | |
| 2008/0146344 A1 | 6/2008 | Rowe | |
| 2008/0150902 A1 | 6/2008 | Edpalm | |
| 2008/0153583 A1 | 6/2008 | Huntley | |
| 2008/0161110 A1 | 7/2008 | Campbell | |
| 2008/0167106 A1 | 7/2008 | Lutnick | |
| 2008/0167118 A1 | 7/2008 | Kroeckel | |
| 2008/0167130 A1 | 7/2008 | Kroeckel | |
| 2008/0182667 A1 | 7/2008 | Davis | |
| 2008/0207307 A1 | 8/2008 | Cunningham, II | |
| 2008/0214258 A1 | 9/2008 | Brosnan | |
| 2008/0214310 A1 | 9/2008 | Brunet De Courssou | |
| 2008/0215319 A1 | 9/2008 | Lu | |
| 2008/0234047 A1 | 9/2008 | Nguyen | |
| 2008/0238610 A1 | 10/2008 | Rosenberg | |
| 2008/0248849 A1 | 10/2008 | Lutnick | |
| 2008/0248865 A1 | 10/2008 | Tedesco | |
| 2008/0252419 A1 | 10/2008 | Batchelor | |
| 2008/0254878 A1 | 10/2008 | Saunders | |
| 2008/0254881 A1 | 10/2008 | Lutnick | |
| 2008/0254883 A1 | 10/2008 | Patel | |
| 2008/0254891 A1 | 10/2008 | Saunders | |
| 2008/0254892 A1 | 10/2008 | Saunders | |
| 2008/0254897 A1 | 10/2008 | Saunders | |
| 2008/0263173 A1 | 10/2008 | Weber | |
| 2008/0268959 A1 | 10/2008 | Bryson | |
| 2008/0300058 A1 | 12/2008 | Sum | |
| 2008/0305864 A1 | 12/2008 | Kelly | |
| 2008/0305865 A1 | 12/2008 | Kelly | |
| 2008/0305866 A1 | 12/2008 | Kelly | |
| 2008/0311994 A1 | 12/2008 | Amaitis | |
| 2008/0318669 A1 | 12/2008 | Buchholz | |
| 2008/0318686 A1 | 12/2008 | Crowder | |
| 2009/0005165 A1 | 1/2009 | Arezina | |
| 2009/0011822 A1 | 1/2009 | Englman | |
| 2009/0017906 A1 | 1/2009 | Jackson | |
| 2009/0021381 A1 | 1/2009 | Kondo | |
| 2009/0029766 A1 | 1/2009 | Lutnick | |
| 2009/0054149 A1 | 2/2009 | Brosnan | |
| 2009/0061990 A1 | 3/2009 | Schwartz | |
| 2009/0069063 A1 | 3/2009 | Thomas | |
| 2009/0077396 A1 | 3/2009 | Tsai | |
| 2009/0088258 A1 | 4/2009 | Saunders | |
| 2009/0098925 A1 | 4/2009 | Gagner | |
| 2009/0104977 A1 | 4/2009 | Zielinski | |
| 2009/0104983 A1 | 4/2009 | Okada | |
| 2009/0118002 A1 | 5/2009 | Lyons | |
| 2009/0118013 A1 | 5/2009 | Finnimore | |

(56) References Cited

U.S. PATENT DOCUMENTS

2009/0118022 A1 5/2009 Lyons
2009/0124366 A1 5/2009 Aoki
2009/0124390 A1 5/2009 Seelig
2009/0131146 A1 5/2009 Arezina
2009/0131151 A1 5/2009 Harris
2009/0131155 A1 5/2009 Hollibaugh
2009/0132163 A1 5/2009 Ashley, Jr.
2009/0137255 A1 5/2009 Ashley, Jr.
2009/0138133 A1 5/2009 Buchholz
2009/0143141 A1 6/2009 Wells
2009/0149245 A1 6/2009 Fabbri
2009/0149261 A1 6/2009 Chen
2009/0153342 A1 6/2009 Thorn
2009/0156303 A1 6/2009 Kiely
2009/0163272 A1 6/2009 Baker
2009/0176578 A1 7/2009 Herrmann
2009/0191962 A1 7/2009 Hardy
2009/0197684 A1 8/2009 Arezina
2009/0216547 A1 8/2009 Canora
2009/0219901 A1 9/2009 Bull
2009/0221342 A1 9/2009 Katz
2009/0227302 A1 9/2009 Abe
2009/0239666 A1 9/2009 Hall
2009/0264190 A1 10/2009 Davis
2009/0270166 A1 10/2009 Thukral
2009/0270170 A1 10/2009 Patton
2009/0271287 A1 10/2009 Halpern
2009/0275402 A1 11/2009 Backover
2009/0275410 A1 11/2009 Kisenwether
2009/0275411 A1 11/2009 Kisenwether
2009/0280910 A1 11/2009 Gagner
2009/0282469 A1 11/2009 Lynch
2009/0298468 A1 12/2009 Hsu
2010/0002897 A1 1/2010 Keady
2010/0004058 A1 1/2010 Acres
2010/0016069 A1 1/2010 Herrmann
2010/0049738 A1 2/2010 Mathur
2010/0056248 A1 3/2010 Acres
2010/0062833 A1 3/2010 Mattice
2010/0062840 A1 3/2010 Herrmann
2010/0079237 A1 4/2010 Falk
2010/0081501 A1 4/2010 Carpenter
2010/0081509 A1 4/2010 Burke
2010/0099499 A1 4/2010 Amaitis
2010/0105454 A1 4/2010 Weber
2010/0106612 A1 4/2010 Gupta
2010/0115591 A1 5/2010 Kane-Esrig
2010/0120486 A1 5/2010 Dewaal
2010/0124967 A1 5/2010 Lutnick
2010/0130276 A1 5/2010 Fiden
2010/0160035 A1 6/2010 Herrmann
2010/0160043 A1 6/2010 Fujimoto
2010/0178977 A1 7/2010 Kim
2010/0184509 A1 7/2010 Sylla
2010/0197383 A1 8/2010 Rader
2010/0197385 A1 8/2010 Aoki
2010/0203955 A1 8/2010 Sylla
2010/0203957 A1 8/2010 Enzminger
2010/0203963 A1 8/2010 Allen
2010/0227662 A1 9/2010 Speer, II
2010/0227670 A1 9/2010 Arezina
2010/0227671 A1 9/2010 Laaroussi
2010/0227687 A1 9/2010 Speer, II
2010/0234091 A1 9/2010 Baerlocher
2010/0279764 A1 11/2010 Allen
2010/0323780 A1 12/2010 Acres
2010/0325703 A1 12/2010 Etchegoyen
2011/0009181 A1 1/2011 Speer, II
2011/0039615 A1 2/2011 Acres
2011/0053679 A1 3/2011 Canterbury
2011/0065492 A1 3/2011 Acres
2011/0076941 A1 3/2011 Taveau
2011/0086696 A1 4/2011 Macewan
2011/0105216 A1 5/2011 Cohen
2011/0111827 A1 5/2011 Nicely
2011/0111843 A1 5/2011 Nicely
2011/0111860 A1 5/2011 Nguyen
2011/0118010 A1 5/2011 Brune
2011/0159966 A1 6/2011 Gura
2011/0183732 A1 7/2011 Block
2011/0183749 A1 7/2011 Allen
2011/0207525 A1 8/2011 Allen
2011/0212711 A1 9/2011 Scott
2011/0212767 A1 9/2011 Barclay
2011/0223993 A1 9/2011 Allen
2011/0244952 A1 10/2011 Schueller
2011/0263318 A1 10/2011 Agarwal
2011/0269548 A1 11/2011 Barclay
2011/0306400 A1 12/2011 Nguyen
2011/0306426 A1 12/2011 Novak
2012/0015709 A1 1/2012 Bennett
2012/0028703 A1 2/2012 Anderson
2012/0028718 A1 2/2012 Barclay
2012/0034968 A1 2/2012 Watkins
2012/0046110 A1 2/2012 Amaitis
2012/0094769 A1 4/2012 Nguyen
2012/0100908 A1 4/2012 Wells
2012/0108319 A1 5/2012 Caputo
2012/0115591 A1 5/2012 Palermo
2012/0122561 A1 5/2012 Hedrick
2012/0122567 A1 5/2012 Gangadharan
2012/0122584 A1 5/2012 Nguyen
2012/0122590 A1 5/2012 Nguyen
2012/0172130 A1 7/2012 Acres
2012/0184362 A1 7/2012 Barclay
2012/0184363 A1 7/2012 Barclay
2012/0185398 A1 7/2012 Weis
2012/0190426 A1 7/2012 Acres
2012/0194448 A1 8/2012 Rothkopf
2012/0208618 A1 8/2012 Frerking
2012/0231885 A1 9/2012 Speer, II
2012/0239566 A1 9/2012 Everett
2012/0322563 A1 12/2012 Nguyen
2012/0330740 A1 12/2012 Pennington
2013/0005433 A1 1/2013 Holch
2013/0005443 A1 1/2013 Kosta
2013/0005453 A1 1/2013 Nguyen
2013/0059650 A1 3/2013 Sylla
2013/0065668 A1 3/2013 LeMay
2013/0103965 A1 4/2013 Golembeski, Jr.
2013/0104193 A1 4/2013 Gatto
2013/0130766 A1 5/2013 Harris
2013/0132745 A1 5/2013 Schoening
2013/0165210 A1 6/2013 Nelson
2013/0185559 A1 7/2013 Morel
2013/0196756 A1 8/2013 Nguyen
2013/0196776 A1 8/2013 Nguyen
2013/0210513 A1 8/2013 Nguyen
2013/0210514 A1 8/2013 Nguyen
2013/0210530 A1 8/2013 Nguyen
2013/0225279 A1 8/2013 Patceg
2013/0225282 A1 8/2013 Williams
2013/0252730 A1 9/2013 Joshi
2013/0281187 A1 10/2013 Skelton
2013/0281188 A1 10/2013 Guinn
2013/0316808 A1 11/2013 Nelson
2013/0337878 A1 12/2013 Shepherd
2013/0337889 A1 12/2013 Gagner
2014/0006129 A1 1/2014 Heath
2014/0057716 A1 2/2014 Massing
2014/0087862 A1 3/2014 Burke
2014/0094295 A1 4/2014 Nguyen
2014/0094316 A1 4/2014 Nguyen
2014/0121005 A1 5/2014 Nelson
2014/0179431 A1 6/2014 Nguyen
2014/0274306 A1 9/2014 Crawford, III
2014/0274309 A1 9/2014 Nguyen
2014/0274319 A1 9/2014 Nguyen
2014/0274320 A1 9/2014 Nguyen
2014/0274342 A1 9/2014 Nguyen
2014/0274357 A1 9/2014 Nguyen
2014/0274360 A1 9/2014 Nguyen
2014/0274367 A1 9/2014 Nguyen
2014/0274388 A1 9/2014 Nguyen

(56) References Cited

U.S. PATENT DOCUMENTS

| | | | |
|---|---|---|---|
| 2015/0089595 | A1 | 3/2015 | Telles |
| 2015/0133223 | A1 | 5/2015 | Carter, Sr. |
| 2015/0143543 | A1 | 5/2015 | Phegade |
| 2016/0125695 | A1 | 5/2016 | Nguyen |
| 2017/0016819 | A1 | 1/2017 | Barwicz |
| 2017/0116819 | A1 | 4/2017 | Nguyen |
| 2017/0116823 | A1 | 4/2017 | Nguyen |
| 2017/0144071 | A1 | 5/2017 | Nguyen |
| 2017/0148259 | A1 | 5/2017 | Nguyen |
| 2017/0148261 | A1 | 5/2017 | Nguyen |
| 2017/0148263 | A1 | 5/2017 | Nguyen |
| 2017/0206734 | A1 | 7/2017 | Nguyen |
| 2017/0228979 | A1 | 8/2017 | Nguyen |
| 2017/0243440 | A1 | 8/2017 | Nguyen |
| 2017/0337770 | A1 | 11/2017 | Nguyen |
| 2018/0144581 | A1 | 5/2018 | Nguyen |
| 2019/0005773 | A1 | 1/2019 | Nguyen |
| 2019/0122490 | A1 | 4/2019 | Nguyen |
| 2019/0122492 | A1 | 4/2019 | Nguyen |
| 2019/0213829 | A1 | 7/2019 | Nguyen |
| 2020/0372753 | A1 | 11/2020 | Nguyen |

FOREIGN PATENT DOCUMENTS

| | | | |
|---|---|---|---|
| GB | 2096376 | A | 10/1982 |
| GB | 2097570 | A | 11/1982 |
| GB | 2335524 | A | 9/1999 |
| JP | 12005000454 | | 5/2007 |
| WO | 2005073933 | | 8/2005 |
| WO | 2008027621 | | 3/2008 |
| WO | 2009026309 | | 2/2009 |
| WO | 2009062148 | | 5/2009 |
| WO | 2010017252 | | 2/2010 |

OTHER PUBLICATIONS

Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448, dated Oct. 22, 2019.
Notice of Allowance for U.S. Appl. No. 15/495,975, dated Oct. 23, 2019.
Notice of Allowance for U.S. Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 16/162,358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action (Non-Final Rejection) dated Jul. 14, 2022 for U.S. Appl. No. 16/559,553 (pp. 1-7).
Office Action (Notice of Allowance and Fees Due (PTOL-85)) dated Feb. 17, 2023 for U.S. Appl. No. 16/559,553 (pp. 1-14).
Benston, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296, 182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633, 118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801, 121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Final Office Action for U.S. Appl. No. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action fpr U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/632,828, mailed Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Office Action for U.S. Appl. No. 12/797,616, dated Aug. 10, 2015.
Final Office Action for U.S. Appl. No. 13/801,234, dated Aug. 14, 2015.
Office Action for U.S. Appl. No. 13/801,121, dated Oct. 2, 2015.

(56) References Cited

OTHER PUBLICATIONS

Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Notice of Allowance for U.S. Appl. No. 13/843,192, dated Aug. 10, 2016.
Final Office Action for U.S. Appl. No. 14/211,536, dated Nov. 14, 2016.
Brochure, 5000 Ft. Inc., 1 page, Nov. 2010.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Office Action for U.S. Appl. No. 13/801,171, dated Jun. 6, 2016.
Final Office Action for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Advisory Action for U.S. Appl. No. 13/296,182, dated May 8, 2014.
"Professional Casino Slot Machine", Posted at www.vbtutor.net/VB. Sample/vbslot2.htm on Oct. 20, 2009.
Final Office Action for U.S. Appl. No. 16/794,212, dated Feb. 17, 2021.
Office Action for U.S. Appl. No. 16/351,416, dated Feb. 23, 2021.
Office Action for U.S. Appl. No. 15/674,480, dated Mar. 25, 2021.
Final Office Action for U.S. Appl. No. 16/219,940, dated Mar. 26, 2021.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 16/190,050, dated Jun. 1, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/600,395, dated Dec. 22, 2020.
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.

* cited by examiner

GAMING SYSTEMS INCLUDING VIRAL BENEFIT DISTRIBUTION

CROSS-REFERENCE TO RELATED APPLICATIONS

This application is a continuation of U.S. application Ser. No. 16/559,553, filed Sep. 3, 2019, and entitled "GAMING SYSTEMS INCLUDING VIRAL BENEFIT DISTRIBUTION," which is hereby incorporated herein by reference, and which in turn is a continuation of U.S. application Ser. No. 14/518,909 (now U.S. Pat. No. 10,438,446), filed Oct. 20, 2014, and entitled "VIRAL BENEFIT DISTRIBUTION USING ELECTRONIC DEVICES," which is hereby incorporated herein by reference, and which in turn is a continuation of U.S. application Ser. No. 12/617,717 (now U.S. Pat. No. 8,864,586), filed Nov. 12, 2009, and entitled "GAMING SYSTEMS INCLUDING VIRAL GAMING EVENTS," which is hereby incorporated herein by reference.

FIELD OF THE INVENTION

The present invention relates to games and game features, and particularly to wagering game events.

BACKGROUND OF THE INVENTION

Early gaming machines presented a single wagering game. For example, early slot machines presented a single game in which a set of reels were spun and the stopping positions of the reels define the outcome of the game. Later, video gaming machines were developed. These gaming machines were configured to present slot games in a video format, as well as other games such as video poker.

In order to increase the excitement associated with these games, various secondary game events have been developed. For example, gaming machines have been outfitted with rotating wheels. When a player receives a particular winning result of a base game, such as a particular slot reel outcome, the wheel may spin and stop on a segment which defines a bonus award. Similarly, video gaming machines have been configured to present various video secondary events. These events may comprise a variety of animated sequences which provide entertainment and the potential for awards.

Also, as gaming machines have been linked to gaming systems, awards have been developed which increase the number of participating players. For example, gaming machines may be linked to a jackpot system. If a player of one of the gaming machines of the system obtains a particular winning outcome, they may be awarded the jackpot. In order to increase the level of excitement of such a system, the players of other gaming machines at which the jackpot was not won may be awarded a consolation prize.

Still, these secondary events or awards have limitations, and new and exciting gaming events remain desirable.

SUMMARY OF THE INVENTION

The invention is associated with distribution of viral events, such as viral gaming events, amongst devices. The devices can present the viral events. The devices can, for example, be gaming machines and/or mobile devices.

In accordance with one aspect of the invention, a viral gaming event is triggered and is first presented at one or more first gaming machines at a time T1. The viral gaming event then spreads to one or more second gaming machines at a time T2 which is later than the time T1. The viral gaming event may comprise a gaming event such as a bonus event, or a non-gaming event such as a promotional message from the casino or an alert. The viral gaming event may be the same or different at each gaming machine. The viral gaming event may comprise a single player event (i.e. played by the player of the particular machine) or be a group event (wherein multiple players participate in the event).

The viral gaming event may be triggered in various fashions, such as a result of game play at a particular gaming machine, results or actions at multiple gaming machines, a result of a casino-operator action, or randomly. The viral gaming event might be initiated at a single gaming machine or multiple gaming machines. The viral gaming event may spread to multiple gaming machines, including not only one or more second gaming machines but one or more third, fourth, etc. gaming machines.

The viral gaming event preferably ceases to spread and has an end. The end may be defined by the award of a predetermined amount of bonus awards, the expiration of a time period, infection of a certain number of gaming machines or the like.

The viral gaming event may have various propagation patterns including direction of spread and rate of spread. The viral gaming event may spread in certain directions, may be spread to achieve desired game play goals, may spread randomly, and may spread based upon player qualification criteria or the like. The characteristics of the viral gaming event may be varied. For example, game play metrics obtained from a player tracking system or one or more cameras may be used to determine the particular gaming machines which are infected, the rate of spread or the like. Feedback may be provided during the viral gaming event to modify the characteristics of the event after it is triggered.

Information may be provided to players and potential players regarding infection of gaming machines with the viral gaming event and the spread thereof. Such alerts may comprise visual, audible or other alerts at infected gaming machines. Visual, audio or other information may also be provided regarding the direction of viral event propagation, such as digital signage or light pipes and ropes which illuminate to define paths of spread of the viral gaming event.

In one embodiment the viral gaming event may be implemented by gaming machines in a peer-to-peer networking environment. In another embodiment, a gaming system includes a plurality of gaming machines and at least one viral event server in communication with those gaming machines. The viral event server is preferably configured to spread the viral event to the gaming machines.

In another embodiment, a system for distributing a viral benefit to a mobile device can include at least: a first plurality of mobile devices, each of the first plurality of mobile devices having a display to display a first viral benefit; a second plurality of mobile devices, each of the second plurality of mobile devices having a display to display a second viral benefit; and a viral event server. The viral server can, for example be configured to: determine whether to initiate a viral event; determine a type of first viral benefit to distribute to one or more of the first plurality of mobile devices if it is determined that the viral event is initiated; distribute the first viral benefit to one or more of the first plurality of mobile devices; determine whether to distribute the second viral benefit to one or more of the second plurality of mobile devices; and transmit the second viral benefit to the one or more of the second plurality of mobile devices if it is determined that the second viral benefit to one or more of the second plurality of mobile devices is to be distributed.

In another embodiment, a method for distributing a viral benefit to a mobile device can include at least: determining, at a server, whether to initiate a viral event; determining, at the server, a first viral benefit to distribute to one or more of a first plurality of mobile devices if it is determined that the viral event is initiated; distributing the viral benefit to one or more of the first plurality of mobile devices; determining whether to distribute a second viral benefit to one or more of a second plurality of mobile devices; and transmitting the second viral benefit to the one or more of the second plurality of mobile devices if it is determined that the second viral benefit to one or more of the second plurality of mobile devices is to be distributed.

In still another embodiment, a program storage device readable by a machine tangibly embodying a program of instructions executable by the machine can perform a method for distributing a viral benefit to a mobile device. The method can, for example, include at least: determining, at a server, whether to initiate a viral event; determining, at the server, a first viral benefit to distribute to one or more of a first plurality of mobile devices if it is determined that the viral event is initiated; distributing the viral benefit to one or more of the first plurality of mobile devices; determining whether to distribute a second viral benefit to one or more of a second plurality of mobile devices; and transmitting the second viral benefit to the one or more of the second plurality of mobile devices if it is determined that the second viral benefit to one or more of the second plurality of mobile devices is to be distributed. The transmitting of the second viral benefit to the one or more second mobile devices can be triggered by an event at one or more of the first plurality of mobile devices.

Further objects, features, and advantages of the present invention over the prior art will become apparent from the detailed description which follows, when considered with the figures provided herein.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises viral game events, methods of game play ("games") including such events, and gaming machines and systems configured to present such events or features. A viral gaming event of the invention comprises a gaming event, such as a bonus or secondary event, which spreads from one or more first gaming machines to one or more additional gaming machines.

Content associated with a viral game event could be a game feature such as a bonus, a game symbol, a message from the server, a promotional message from the casino, an informational alert, and the like. The viral game event could be implemented as a software module. The software module monitors game events, gathers data, views files, processes logic, displays animation, etc., at the gaming devices. In one implementation, the viral game software is a self-contained distributed software application that's constructed with popular programming and languages such as C, C++, Java, C #, Perl, Javascript, Python, etc. The software module is transferred to a gaming device for execution. In another implementation, the viral game event is built as a web service to be executed at a remote server.

Figure 1:
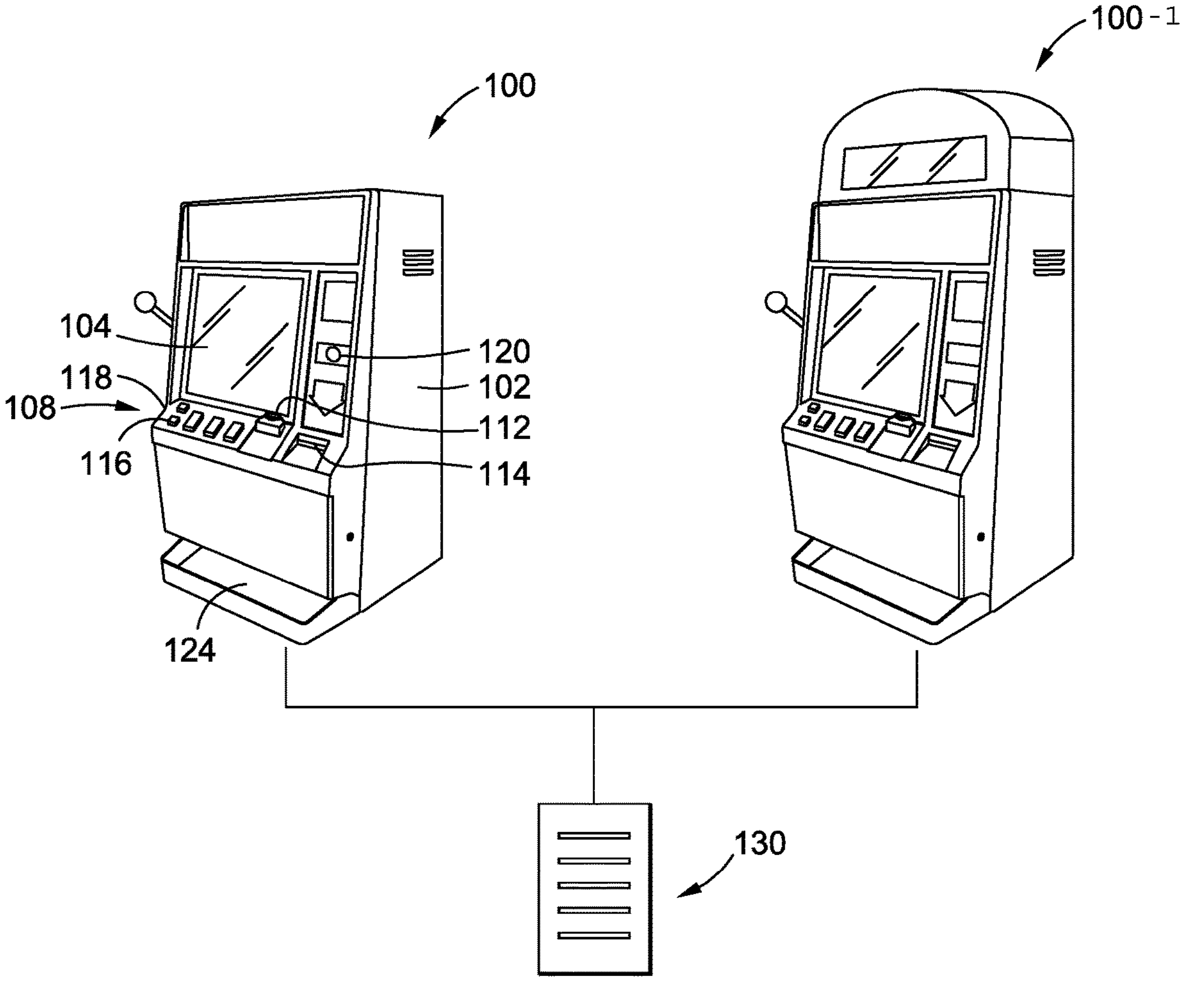
FIG. 1 illustrates gaming machines and a gaming system which may present a viral gaming event of the invention.

FIG. 1 illustrates one embodiment of a gaming machine or device 100 at which a viral gaming event or feature of the invention may be presented. The gaming machine 100 might be located in various environments, such as a casino.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 includes a door located at a front thereof, the door capable of being moved between an open position which allows access to the interior, and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type, "bar-top" or other configuration as is well known to those of skill in the art).

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), multilayer LCD display, an E-ink display, a light emitting display (LED, OLED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. The gaming machine 100 may include two or more display devices. For example, a secondary display device might be associated with the housing or cabinet 102 along with the main display device 104, or might be associated with a top box or the like, as illustrated in FIG. 1.

The gaming machine 100 may be configured to present a wide variety of games. Such games might be Class III type games such as slot games and video poker games, or Class II type games such as bingo, pull-tab games, lotto or instant lottery style games. In one embodiment, certain game outcomes may be designated as winning outcomes. Prizes or awards may be provided for winning outcomes, such as monetary payments (or representations thereof, such as prize of credits), or the like. As detailed below, one or more of the awards may have certain characteristics or features.

The gaming machine 100 also preferably includes one or more player input devices 108 (such as input buttons, plunger mechanisms, a touch-screen display, joystick, touch-pad or the like) that may be utilized by the player to facilitate game play. Also included in the player input devices 108 is a means for accepting monetary value. As illustrated in FIG. 1, a coin accepting mechanism 112 may be provided for accepting coins and a currency or bill acceptor 114 may be provided for accepting cash or paper currency, or a ticket reader may be provided for accepting and reading tickets or other representations of cash or currency. It is contemplated that other mechanisms may be provided for accepting a payment, such as credit card, ticket readers or input devices whereby a player may have funds paid from a remote account.

In one preferred embodiment, the gaming machine 100 includes a microprocessor or controller (not shown) for controlling the gaming machine, including receiving player input and sending output signals for controlling the various components of the machine 100 (such as generating game information for display by the display 104). The controller may be arranged to receive input such as a purchase/bet signal when a purchase/bet button is depressed, and a currency insert signal when a player inserts bills or coins. The controller may be arranged to send signals for determining winning combinations, for causing the coin hopper/dispenser, or printer, or an electronic fund transfer (EFT), to pay winnings, and to cause the display to display winning amount information. In addition, the controller is preferably arranged to determine if a round of game play has resulted in a win, and if so, the prize to be awarded to the player for that win.

The controller may be configured to execute machine readable code or "software" or otherwise process information, such as obtained from a remote server. Software or other instructions may be stored on a memory or data storage device. The memory may also store other information, such as pay table information. The gaming machine 100 may also include one or more random number generators for generating random numbers for generating random game outcomes, or such might be located remotely. For example, if the gaming machine 100 is a stand-alone machine configured to present a slot game or a video poker game, the random number generator(s) might be located at the machine. However, if the gaming machine 100 is used to present server-based or networked games, such as bingo games, the random number generator(s) might be located at the server.

In operation, the player may initiate game play by providing value, such as a wager. The wager may be made by activating one of the player input devices 108 such as a one credit button 116 which places a single credit purchase or wager or a max credit button 118 which places a maximum purchase or wager for that round of game play. The maximum purchase or wager is commonly defined as playing or betting an amount comprising a multiple of the value of a single purchase or wager up to a predefined upper purchase or bet limit or threshold. When the player actuates either the one credit button 116 or the max credit button 118, a wager is placed or purchase is made in that amount and the player's credit base is decreased by the number of credits wagered. The player's remaining credit base is typically displayed to the player by way of the display device 104. Upon making a purchase or placing a wager, the game may begin automatically or the player may join a game already in progress, or the player may initiate the game by activating another player input device, upon which the gaming machine 100 presents one or more game elements which are used to determine if the player has received a winning combination.

The gaming machine 100 generally includes a means for awarding a player a prize or winnings accumulated during game play. When a player obtains a winning outcome, the player is preferably paid prizes or awards in the form of stored credits, the amount of which is indicated to the player on the display 104. A "cash out" button may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base.

Typically when a player cashes out, the gaming machine 100 is configured to dispense a media or voucher, such as via a printer 114, which represents the cash-out value. The player may utilize this voucher at other gaming machine or convert the voucher to currency, such as at a cashier's station. However, depending upon the configuration of the gaming machine 100, the player might receive a cash or coin disbursement. For example, the gaming machine 100 might be configured to activate a coin hopper or coin handling device (not shown) which physically counts and delivers the proper number of coins to the player. The coin handling device is commonly configured to transport coins from a supply source (hopper or bin filled with coins) to a coin tray 124 or payout receptacle where the player physically receives the coins.

As indicated above, the gaming machine 100 may be configured as a stand-alone device, such as when the machine is configured to present a slot game or a video poker game. As detailed below, however, the gaming machine 100 may be a server-based or networked machine. For example, the gaming machine 100 may be configured to obtain game code or game outcome information from a remote server 130. The gaming machine 100 may also communicate with a remote accounting server and/or player tracking server, as is well known in the art.

It will be appreciated that the gaming machine and system described and illustrated in FIG. 1 is only exemplary of an environment for a game of the invention. For example, it is possible to implement the events or features of the invention via other types of gaming devices, such as computing devices such as home and laptop computers, including in an on-line, web-based environment. Additionally, a gaming machine or device 100 could take the form of a gaming table, a kiosk, iTV, a set-top box, or various mobile devices (such as a smart phone, PDA, media player, or tablet computer), etc.

One aspect of the invention is a viral gaming event or feature. Such an event may be presented at a gaming machine or device 100 such as described above.

The viral gaming event of the invention has two primary components: a viral gaming event trigger and viral gaming event spread or transmission. The viral gaming event is initiated by a trigger. The trigger may be random and/or be a particular event. For example, the trigger may be generated randomly at a server or a gaming machine. Alternatively, the trigger might occur when a particular game result occurs. Such an outcome might be the appearance of a particular symbol or a group of symbols, one or more winning game outcomes, certain non-winning outcomes, or various other events at a gaming machine or groups of gaming machines. Other events might comprise a certain number of credits wagered or a certain number of games played at a gaming machine or across a gaming system, or a group of symbols or outcomes received at a bank, or a jackpot received at one or more gaming machines, or a predefined time, place, or machine designated by the casino manager, for example.

Upon the trigger, the viral gaming event is initiated at one or more first gaming machines. Initiation of the event at a gaming machine is akin to "infection" of the machine with the viral gaming event. In one embodiment in which the trigger is a particular event at a gaming machine, the viral gaming event is initiated at that gaming machine. However, the event might be initiated at more than one gaming machine, such as gaming machines spread across the floor of a casino, the gaming machines of a bank of gaming machines or the like. Another salient characteristic is that the viral gaming event can "hop" to other qualified games or machines even before the event is consummated at the "infected" game or machine. Like a biological flu, this viral propagation during the incubation period speeds up the propagation and create more excitement for the players because of the multiple potential payouts that overlap and sequentially occurring all around the players. Even when multiple games are being played simultaneously at one gaming machine, the concurrent games can be susceptible to "infection" if they meet the criteria.

The viral gaming event may be coupled with or comprise content related to any number of events. For example, the viral gaming event might comprise a game, a bonus event, a secondary game or the like. Other contents such as a notification of a 3$^{rd}$-party sponsored prize, a bonus alert, a promotional message, an advertisement, a group message, music, video, and the like can also be coupled with a viral gaming event. The viral gaming event might be the same for each gaming machine regardless of the type or manufacturer of the gaming machine. For example, the viral gaming event might comprise a particular animated bonus event, regardless of whether the gaming machine is a spinning reel slot machine or video poker machine. In other embodiment, the viral gaming event might vary depending upon the gaming machine, the game being played, the player, time, and/or other parameters. For example, the viral gaming event might comprise a bonus opportunity for a 1000 credit payout. At a video poker machine the viral gaming event might be presented as a poker game having the opportunity for a 1000 credit payout if a particular win is achieved, while at a slot machine the viral gaming event might be presented as a spin of the reels with the opportunity for a 1000 credit payout if a particular symbol or combination of symbols is achieved. The configuration of a game on a gaming machine can also cause a variation of viral gaming event. For example, a viral gaming event may present an opportunity for a player of a gaming machine to win a $10,000 progressive jackpot (a traveling progressive) at a $5-denominated slot game, and may present a $1,000 jackpot at a $0.25 denominated game. Such a traveling progressive jackpot offers a player of the infected gaming machine a limited time (the infection period) to win a portion of its funds, scaled up or down proportionately with the amount that a player bets.

The viral gaming event might comprise a single player/machine event or it might comprise a group play type event. In a group play implementation, a community bonus event could cause multiple viral bonus events to be subsequently generated at nearby slot machines associated with the group game. For example, when a community bonus wheel is spinning in a group game, it could generate a viral bonus event that "infects" nearby associated gaming machines and cause them to have bonus spins at a later time. The viral gaming event continues to hop or spread to other qualified games until a termination event occurs. Also, the viral gaming event might result in an award, such as a bonus award, or it might have one or more outcomes that do not result in any additional award. The value of the awards that may be won at a particular machine may be based upon the size of player's wager, a side wager, a random event, or the like.

The viral gaming event may be presented via the main display of a gaming machine, via a secondary display or by one or more displays or devices common to one or more gaming machines. The viral gaming event might require one or more player inputs. The viral gaming event might be presented without a requirement for a further wager or might require a player to place a wager or an additional wager. In one embodiment, a player may be required to place a side wager in order to be eligible for the viral gaming event to spread to their machine.

In accordance with the invention, the viral gaming event preferably spreads from one or more first gaming machines to one or more other gaming machines over time. In particular, after the viral gaming event is initiated at the one or more first gaming machines at a first time T1, it spreads to and is initiated at one or more additional gaming machines at a time T2. The time delay between when the viral gaming event is initiated at the one or more first gaming machines and the one or more additional gaming machines may vary. For example, the time delay could be very short (seconds) or long (minutes, hours, etc.).

In addition, the viral gaming event may spread beyond one or more second gaming machines to other gaming machines. As one example, the total number of gaming machines "infected" over time may be bell curved (i.e. one or more gaming machines at time T1, increasing to a higher number of gaming machines at a time T2 and then decreasing to a fewer number of machines at a time T3). The number of gaming machines which are infected may also be random or have various other patterns, such as increasing linearly, geometrically, or exponentially over time until an end time.

It will also be appreciated that the rate of spread of the viral gaming event may vary. For example, the viral gaming event may spread from one or more first gaming machines at a time T1 to one or more second gaming machines in a time T2, and from the one or more second gaming machines to one or third gaming machines in a time T3, where the time intervals between T2/T1 and T3/T2 differ.

In one embodiment, the viral gaming event preferably ends or stops spreading at some point in time. When the viral gaming event ends, it preferably no longer spreads to additional gaming machines. The spread of the viral gaming event may end after a certain number of gaming machines have been infected, after a period of time from when the one or more first gaming machines were infected, until a pool of award money has been exhausted, or based upon various other criteria. In a preferred embodiment, the viral gaming event ends before all gaming machines in a particular location or environment are infected, whereby the viral gaming event is perceived as a special or bonus event as to those machines which receive it (compared to those which do not).

The viral gaming event may end at a particular machine once the event has been played or presented at that machine (though the event may still be spreading to other machines and/or games before the consummation of the viral gaming event at the current gaming machine/game). If the viral gaming event has a long duration, such as a group-type event, then the viral gaming event might end at each machine at a termination time. For example, once a viral gaming event is initiated at a gaming machine it may continue until the entire viral gaming event is terminated at all machines, as detailed below.

Once each gaming machine is infected, the viral gaming event is presented at that gaming machine. As indicated, the viral gaming event which is presented at each machine may be unique (i.e., tailored to a player or a game), or may be similar the event presented at other gaming machines.

Figure 2:
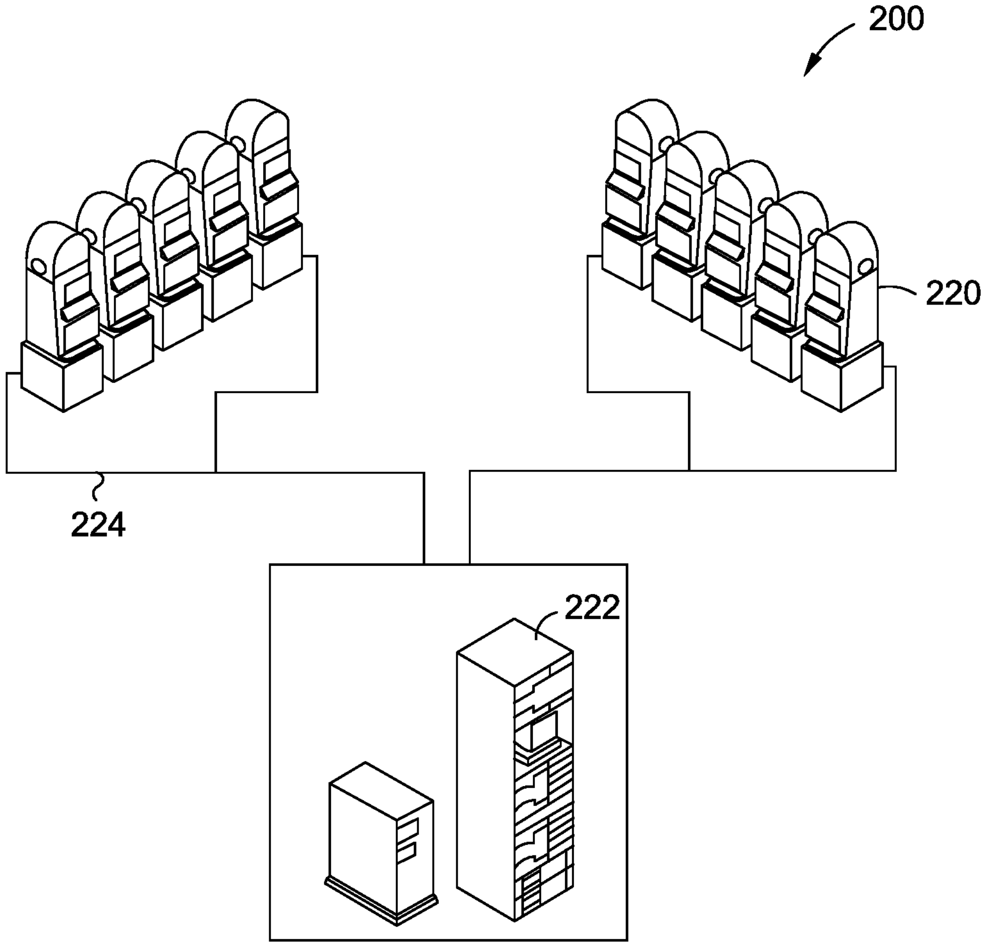
FIG. 2 illustrates a gaming system configured to present viral gaming events.

In a preferred embodiment, the viral gaming event is implemented in a gaming system including multiple gaming machines. Preferably, the event is controlled by one or more system controllers. The system controller might comprise a server which is in communication with the gaming machines. FIG. 2 illustrates one embodiment of such a system 200. The system 200 includes a plurality of gaming machines 220. Those gaming machines 220 may have the same or different configurations, may be produced by the same or different gaming machine manufacturers and may be configured to present the same or different games. The gaming machines 220 might be located, for example, in the same area of a casino, in various areas of a casino, or in multiple casinos (or other locations). The gaming machines 220 may be arranged in various configurations. As illustrated, various of the gaming machines 220 may be arranged into rows or banks, but they might also be arranged in other fashions. While in some arrangements the propagation may depend on or be linked to the physical arrangement of the gaming machines, such as not necessary. For example, in the case of mobile devices, such devices might just have to be at the right place at the right time, or possess the right viral triggering characteristics in order for the viral event to spread to them.

The system 200 preferably comprises a controller or server 222. The server 222 may comprise a computing device configured to execute machine readable code. In a preferred embodiment, the server 222 is in communication with the gaming machines 220 via one or more communication links 224. Such links 224 might comprise wired or wireless links, or combinations thereof.

In one embodiment, the server 222 may initiate a viral gaming event trigger. For example, the server 222 might monitor coin-in/credit wager data at the gaming machines 220. If a certain threshold is met, the server 222 may initiate the viral gaming event. Following the decision to instantiate the viral gaming event, the server 222 may determine a propagation pattern, one or more seed gaming machines, and the direction and rate of propagation. The server 222 might select one or more gaming machines 220 at which the event is to be initiated. The server 222 might receive feedback that the triggers that took place, and then spread the viral gaming event to other gaming machines 220.

In another embodiment, a viral gaming event might be triggered at a gaming machine or machines 220. The server 222 is then notified of the triggering event. The server 222 might then determine the propagation pattern, and spread the viral gaming event to other gaming machines 220. This is a hybrid implementation in which the triggering event is initiated by a game or gaming machine and then propagates by a server.

In one embodiment, the server 222 might utilize an existing communication network which links the gaming machines 220, such as a player tracking or accounting system. However, in environments where gaming machines are associated with different systems (such as those of different manufacturers), the server 222 might communicate with each of those different gaming machines via other communication links. Such links might be direct to the gaming machines or might be via the servers of the other systems. If the game or gaming machine supports a standard communication protocol, no protocol translation is needed. However, if the game or gaming machine does not support a standard protocol, a protocol mediator server may be needed to translate the communication commands to the language that the gaming machine supports.

It is also possible for the viral gaming event to be presented by gaming machines in a peer-to-peer environment. In this configuration, each gaming machine may be configured with a viral gaming event application. Each application may determine if a viral gaming event trigger has occurred. If so, that gaming machine may initiate the viral gaming event and then send a message directly to one or more other selected gaming machines to spread the viral gaming event. In a peer-to-peer communication approach, the triggering event takes place at a game and then propagates directly to other qualified games or gaming machines without the need for a central server. A manual approach in which a casino manager initiates the triggering event can take place whether the viral gaming event is constructed via a client-server or a peer-to-peer architecture.

A variety of additional aspects of the invention will now be described.

In one embodiment, spread of the viral gaming event may be random. In other configurations, it may be controlled, such as based upon various criteria. For example, the viral gaming event may be spread from one or more first gaming machines to other gaming machines that have or are experiencing a lower rate of game play. A player tracking or other system may be used to monitor game play at gaming machines across a system. Certain machines, such as in certain areas of a casino, may experience lower rates of play. This information may be provided to the viral gaming event server and the viral gaming event server may cause the viral gaming event to be initiated at or spread to those machines. The viral gaming event may thus be used as a tool to entice players to play gaming machines which are otherwise not being played.

Patterns of infection or rates of infection may also be varied by other factors. For example, the spread of a viral gaming event may be a different rate during the day versus night, or during periods of high gaming activity versus low activity.

In another embodiment, other sensors or devices may be used to provide information to the viral gaming event system for use in controlling the spread of the viral gaming event. For example, instead of using game play information from a player tracking system, the viral gaming system might obtain information from one or more cameras. These cameras may provide visual information regarding the gaming floor, such as information regarding patterns of patron movement, gaming machine occupancy and the like. This information may be analyzed and used by the viral gaming event server in determining the propagation of the viral gaming event. Such camera or other gathered information may also be used during the spread of the gaming event to determine if desired goals are being met (i.e. a feedback control) and, as detailed below, used to change various viral gaming event metrics during the event to achieve those goals.

The viral gaming server may utilize various control strategies. For example, the viral gaming server may employ a pre-programmed strategy in determining the viral gaming event. This strategy might comprise, for example, locating gaming machines which are inactive and spreading the viral gaming event to those machines. The control strategy might include a learning component. For example, the viral gaming event server may employ strategies and feedback in order to modify control strategies. Such strategies might be used and modified, for example, to achieve certain goals such as even player distribution across a gaming floor, maximized gaming machine occupancy or the like.

As one aspect of viral gaming event spread, different viral gaming events may be presented at different times and to different machines. As indicated above, different viral gaming events may be presented at different gaming machines. For example, viral gaming events offering differing levels of awards may be offered at different gaming machines, such as to manipulate play patterns. As one example, viral gaming events with low awards may be initiated at gaming machines that are active and viral gaming events with high awards may be initiated at gaming machines that are inactive (so as to attempt to draw new players to those inactive machines).

As indicated, the spread of the viral gaming event from machine to machine may be based upon various criteria or controls. As other examples, the viral gaming event might spread based upon a geometric progression (a randomly selected or predetermined geometric pattern). Such a pattern might comprise a propagation direction and rate of propagation. The viral gaming event might also spread to proximate gaming machines or the like. In another embodiment, the viral gaming event may spread to players in certain groups or meeting certain qualifications. For example, the viral gaming event may spread to all players having certain common metrics associated with the player tracking/profile information.

In one embodiment, the viral gaming event may only spread to gaming machines which are in active play or may spread based upon other criteria. For example, the viral gaming event might only spread to games where players have met certain qualifying requirements (such as duration of play, minimum player loyalty points, Gold Club members, etc.).

However, in other embodiments, the viral gaming event may spread to inactive gaming machines or may spread based upon other/external criteria than player qualification. As indicated, for example, the viral gaming event may be spread to gaming machines with a low level of game play. In the event a gaming machine is inactive, it is possible that the viral gaming event permits a player to achieve winnings without a wager. For example, a player might travel to a gaming machine which has been infected and the player may be permitted to play a bonus viral gaming event with the opportunity for winnings without any wager.

In one embodiment, when a gaming machine is infected with the viral gaming event (or the event is initiated at that gaming machine), notification may be provided to the player thereof and/or potential players via various messaging technologies. For example, various types of visible, audible or other alerts such as email, text messages to a player's mobile device (such as a phone or PDA) may be provided. Such alerts might comprise notification via the main display of the gaming machine, a secondary display, various lights or speakers. In one embodiment, the alert might comprise an audible notification that the gaming machine has been "infected". Preferably, such alerts can be used by players or potential players to track or monitor to the spread of the viral gaming event.

In one embodiment, path lighting or other elements might be used to display the spread of the viral gaming event. Path lighting in a floor, ceiling or the like may define multiple paths between gaming machines of a casino. The particular paths of spread may be illuminated, thus providing players with a visual indication of how the viral gaming event is spreading. Other types of alerts or indicators may be provided, such as laser light, sound propagation, synchronized vibration of the chairs, vibrating the player's mobile device, text messaging to the player's mobile device, and the like.

Figure 3:
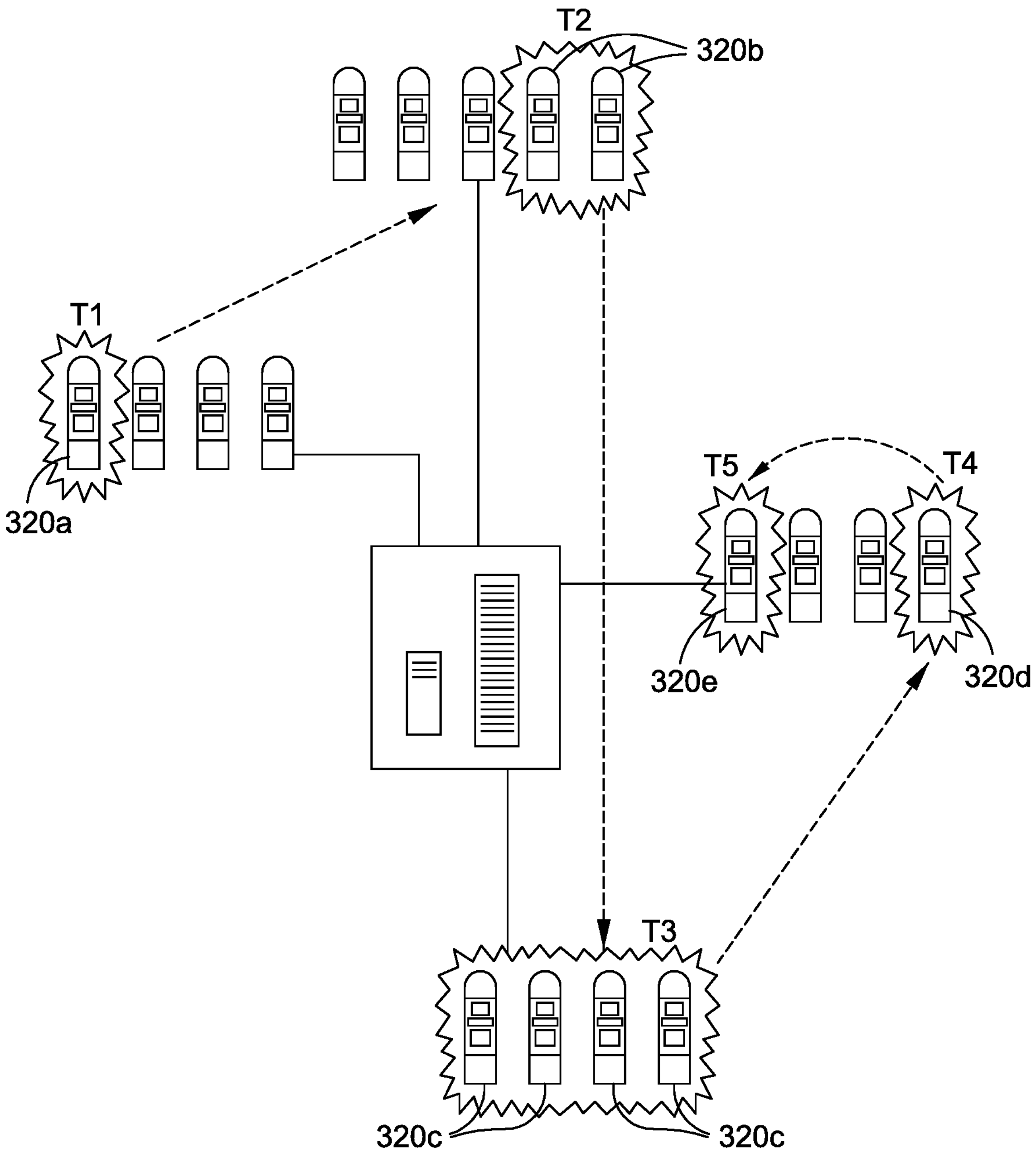
FIG. 3 illustrates propagation of a viral gaming event to multiple gaming machines.

FIG. 3 illustrates one example of this feature of the invention. As illustrated, the viral gaming event was initiated at a single gaming machine 320*a*. An alert notifies any player of that machine and other players in the area that the viral gaming event has been initiated at that machine. The viral gaming event then spread to two more gaming machines 320*b* in a different location, then an entire bank of gaming machines 320*c* in yet another location, then to a single gaming machine 320*d* in yet another bank of gaming machines, and finally to a last gaming machine 320*e* in that same bank of gaming machines. Each time a gaming machine is infected and/or the viral gaming event is initiated at the gaming machine, an alert is preferably provided. In this manner, players can track the spread of the viral gaming event.

In one embodiment, it is possible for there to be a time delay between when a gaming machine is infected with the viral gaming event and when it is presented at the gaming machine. This might be referred to as an incubation period. For example, the viral gaming event might spread to one or more second gaming machines. An alert may be provided to the players thereof that the gaming machines have been infected. However, the viral gaming event itself might be presented immediately or after some period of time. In this manner, a player knows that the machine is infected and the viral gaming event will be presented, but does not know when. This entices the player to continue to play the gaming machine in anticipation of the viral gaming event being presented. During the incubation period, the viral gaming event may continue to propagate and infect other games. Thus, the viral gaming event may overlap at two or more games/gaming machines (as compared to an embodiment wherein the virus spreads sequentially and an event at one or more games/gaming machines must end before another event starts at other games/gaming machines).

As one aspect of the invention, viral gaming event data may be gathered and analyzed. Information may be gathered regarding the results of viral gaming events at each individual machine, the number of viral gaming events initiated vs. those which were played (i.e. were inactive machines played when the event was initiated at the machine), etc. This information may be used to determine how future viral gaming events are initiated or spread, the awards to be offered and the like.

It will be appreciated that the various features of the invention may be utilized in various combinations. For example, the viral gaming event may be configured to spread at differing rates over time, coupled with feedback control which causes the viral gaming event to spread to particular gaming machines based upon rate of game play. Further, multiple viral gaming events can occur on a casino floor, allowing such hybrid events as a game being infected with more than one viral gaming event at one time. This allows the player to be eligible for multiple bonuses, for instance.

In accordance with the invention, numerous advantages are realized. The present invention substantially increases the excitement of playing games, including wagering games. In particular, players know that a bonus or other gaming event which is additional to their base gaming event may be triggered and presented at any time. More importantly, even if such an event is not initiated at their gaming machine, if that event is initiated at another gaming machine it may still spread to their gaming machine. Once a gaming machine is infected, players can anticipate infection of other machines. Thus, substantial anticipation is created while the viral gaming event spreads through the various gaming machines.

An additional advantage of the viral gaming event is that it may be used to increase gaming play. Aside from the inherent excitement that the event presents, the viral gaming event may be particularly spread to gaming machines having low gaming activity. This spread may entice players to follow the spread of the viral gaming event to those machines. As players move to those machines, game play is increased on those gaming machines.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming system, comprising:

one or more initiating devices configured to determine whether to initiate a viral event in a gaming area;

one or more first electronic gaming devices located in the gaming area, the one or more first electronic gaming devices being configured to initiate the viral event in response to the one or more initiating devices determining to initiate the viral event in the gaming area, the one or more first electronic gaming devices being further configured to award an additional payout as part of the viral event;

one or more second electronic gaming devices located in the gaming area, the one or more second electronic gaming devices being configured to be infected by a spread of the viral event after the viral event is initiated at the one or more first electronic gaming devices and, in response to being infected, award the additional payout as part of the viral event, the one or more first electronic gaming devices being configured to incubate the viral event such that the additional payout of the viral event is awarded at the one or more first electronic gaming devices after the viral event is spread to the one or more second electronic gaming devices; and a plurality of visual, audible, or haptic output devices located in the gaming area between the first and second electronic gaming devices, the plurality of visual, audible, or haptic output devices being configured to provide an output indicating a propagation path of the viral event between the first and second electronic gaming devices.

2. The system of claim 1, wherein the incubating of the viral event at the one or more first electronic gaming devices comprises providing a viral event alert at the one or more first electronic gaming devices prior to the viral event being spread to the one or more second electronic gaming devices, but not awarding the additional payout at the one or more first electronic gaming devices until after the viral event is spread to the one or more second electronic gaming devices, the viral event alert indicating that the viral event has been initiated at, or spread to, the one or more first electronic gaming devices.

3. The system of claim 1, wherein the plurality of visual, audible, or haptic output devices comprises a plurality of lights positioned in, or on, ceiling between the one or more first and second electronic gaming devices.

4. The system of claim 1, wherein the viral event comprises a bonus event, a secondary game, a promotion, an advertisement, a message, music, or a video.

5. The system of claim 1, wherein the one or more initiating devices comprise the one or more first electronic gaming devices, the one or more second electronic gaming devices, one or more third electronic gaming devices, or one or more computing devices.

6. The system of claim 5, wherein the one or more initiating devices are further configured to determine how long after the viral event is initiated at the one or more first electronic gaming devices to spread the viral event to the one or more second electronic gaming devices based on a time of day or whether gaming activity is currently high or low.

7. The system of claim 5, further comprising one or more cameras located in the gaming area or a player tracking system, the one or more initiating devices being configured to select the one or more second electronic gaming devices from a plurality of gaming devices based on game play information obtained from the one or more cameras or the player tracking system.

8. A non-transitory computer readable medium, comprising machine readable instructions which, when executed by processing circuitry, causes the processing circuitry to:

determine whether to initiate a viral event in a gaming area;

in response to determining to initiate the viral event, initiate the viral event at one or more first electronic gaming devices;

select, from a plurality of electronic gaming devices in the gaming area, one or more second electronic gaming devices to receive the viral event based on game play information obtained from one or more cameras in the gaming area or a player tracking system;

after initiating the viral event at the one or more first electronic gaming devices, spread the viral event to the one or more second electronic gaming devices; and incubate the viral event at the one or more first electronic gaming devices, such that an additional payout of the viral event is awarded at the one or more first electronic gaming devices after the viral event is spread to the one or more second electronic gaming devices.

9. The non-transitory computer readable medium of claim 8, wherein incubating of the viral event at the one or more first electronic gaming devices comprises providing a viral event alert at the one or more first electronic gaming devices prior to the viral event being spread to the one or more second electronic gaming devices, but not awarding the additional payout at the one or more first electronic gaming devices until after the viral event is spread to the one or more second electronic gaming devices, the viral event alert indicating that the viral event has been initiated at, or spread to, the one or more first electronic gaming devices.

10. The non-transitory computer readable medium of claim 8, wherein the game play information comprises a pattern of patron movement within the gaming area, or usage of the plurality of electronic gaming devices in the gaming area.

11. The non-transitory computer readable medium of claim 10, wherein the one or more second electronic gaming devices are selected to receive the viral event in response to the game play information indicating the one or more second electronic gaming devices have low usage rates.

12. The non-transitory computer readable medium of claim 8, wherein the viral event comprises a bonus event, a secondary game, a promotion, an advertisement, a message, music, or a video.

13. The non-transitory computer readable medium of claim 8, comprising machine readable instructions which, when executed by the processing circuitry, further cause the processing circuitry to: determine how long after initiating the viral event at the one or more first electronic gaming devices to spread the viral event to one or more second electronic gaming devices based on a time of day or whether gaming activity is currently high or low.

14. The non-transitory computer readable medium of claim 8, comprising machine readable instructions which, when executed by the processing circuitry, further cause the processing circuitry to: provide a visual, audible, or haptic indication of a propagation path of the viral event from the one or more first electronic gaming devices to the one or more second electronic gaming devices using lights, speakers, or haptics positioned between the one or more first and second electronic gaming devices.

15. A method for spreading a viral event, comprising:

determining, at one or more initiating devices, whether to initiate a viral event based on whether a wager meets a threshold, a side wager has been placed, or one or more game outcomes has occurred;

in response to determining to initiate the viral event, initiating the viral event at one or more first electronic gaming devices in a gaming area by the one or more initiating devices;

selecting, from a plurality of electronic gaming devices, by the one or more initiating devices, one or more second electronic gaming devices to receive the viral event, the selection being based on game play information obtained from one or more cameras in the gaming area or a player tracking system;

after initiating the viral event at the one or more first electronic gaming devices, spreading the viral event to the one or more second electronic gaming devices; and providing a visual, audible, or haptic indication of a propagation path of the viral event from the one or more first electronic gaming devices to the one or more second electronic gaming devices using a plurality of lights, speakers, or haptics positioned between the one or more first and second electronic gaming devices.

16. The method of claim 15, further comprising incubating the viral event at the one or more first electronic gaming devices, such that an additional payout of the viral event is awarded at the one or more first electronic gaming devices after the viral event is spread to the one or more second electronic gaming devices.

17. The method of claim 15, wherein the viral event comprises a bonus event, a secondary game, an advertisement, or a video.

18. The method of claim 15, wherein the game play information comprises a pattern of patron movement within the gaming area, or usage of the plurality of electronic gaming devices in the gaming area, and the game play information is obtained from the one or more cameras in the gaming area.

19. The method of claim 15, wherein the indication is provided using lights positioned in, or on, a ceiling between the one or more first and second electronic gaming devices.

20. The method of claim 15, further comprising determining how long after initiating the viral event at the one or more first electronic gaming devices to spread the viral event to the one or more second electronic gaming devices based on a time of day or whether gaming activity is currently high or low.

* * * * *